United States Patent
Ott et al.

(10) Patent No.: US 12,070,743 B2
(45) Date of Patent: Aug. 27, 2024

(54) DISPLACEMENT DEVICE AND METHOD FOR DISPLACING FLUID VOLUMES

(71) Applicant: TECAN TRADING AG, Mannedorf (CH)

(72) Inventors: Philipp Ott, Steg (CH); Adrian Sager, Mannedorf (CH); Thomas Geiges, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 305 days.

(21) Appl. No.: 17/626,385

(22) PCT Filed: Jul. 29, 2020

(86) PCT No.: PCT/EP2020/071425
§ 371 (c)(1),
(2) Date: Jan. 11, 2022

(87) PCT Pub. No.: WO2021/018977
PCT Pub. Date: Feb. 4, 2021

(65) Prior Publication Data
US 2022/0258152 A1    Aug. 18, 2022

(30) Foreign Application Priority Data
Jul. 31, 2019   (EP) .................................... 19189463

(51) Int. Cl.
*B01L 3/02*   (2006.01)
(52) U.S. Cl.
CPC ......... *B01L 3/0231* (2013.01); *B01L 2200/02* (2013.01); *B01L 2400/0478* (2013.01)
(58) Field of Classification Search
CPC ............... G01N 35/04; G01N 35/1009; G01N 35/1011; G01N 35/1079;
(Continued)

(56) References Cited

U.S. PATENT DOCUMENTS

| | | |
|---|---|---|
| 5,895,838 A | 4/1999 | Harjunmaa |
| 2007/0169571 A1 | 7/2007 | May et al. |

(Continued)

FOREIGN PATENT DOCUMENTS

| | | |
|---|---|---|
| CH | 702974 A1 | 10/2011 |
| EP | 2569642 A2 | 3/2013 |

(Continued)

OTHER PUBLICATIONS

International Search Report and Written Opinion for corresponding PCT application No. PCT/EP2020/071425, mailed Oct. 5, 2020.

*Primary Examiner* — Suman K Nath
(74) *Attorney, Agent, or Firm* — Notaro, Michalos & Zaccaria P.C.

(57) ABSTRACT

A displacement device for displacing a displacement volume is disclosed. The device has a first fluid space and a second fluid space. A first piston is arranged in a movable manner within the first fluid space. The first fluid space is connectable to a pipetting device. The first piston is actuatable by an actuation volume of air or of liquid provided by the pipetting device. A second piston is arranged in a movable manner within the second fluid space. The second piston is constructed to displace a displacement volume of a fluid located within the second fluid space when the second piston is actuated. The second piston is actuated in dependence on the first piston that is actuated by the actuation volume. The actuation volume is different from the displacement volume, and a pipetting system has a displacement device and a method of displacing a displacement volume.

26 Claims, 8 Drawing Sheets

Figure 5C:
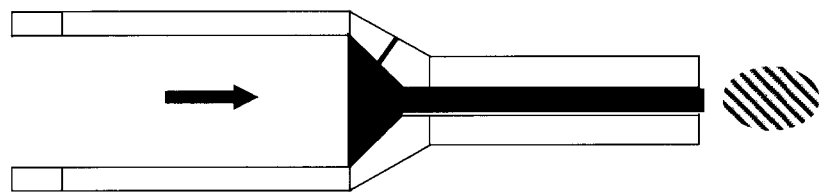

(58) Field of Classification Search
CPC ......... G01N 2035/0405; B01L 3/50825; B01L 3/523; B01L 3/0231; B01L 2300/042; B01L 2300/043; B01L 2200/02; B01L 2200/0605; B01L 2400/0478
See application file for complete search history.

(56) References Cited

U.S. PATENT DOCUMENTS

| | | | |
|---|---|---|---|
| 2010/0209303 A1* | 8/2010 | Tao | B01L 3/0275 |
| | | | 422/523 |
| 2013/0283884 A1* | 10/2013 | Beroz | B01L 3/0293 |
| | | | 73/864.11 |
| 2014/0123776 A1 | 5/2014 | Singer et al. | |
| 2015/0209777 A1 | 7/2015 | Petrek et al. | |

FOREIGN PATENT DOCUMENTS

| | | |
|---|---|---|
| WO | 2018015419 A1 | 1/2018 |
| WO | 2018015421 A1 | 1/2018 |

\* cited by examiner

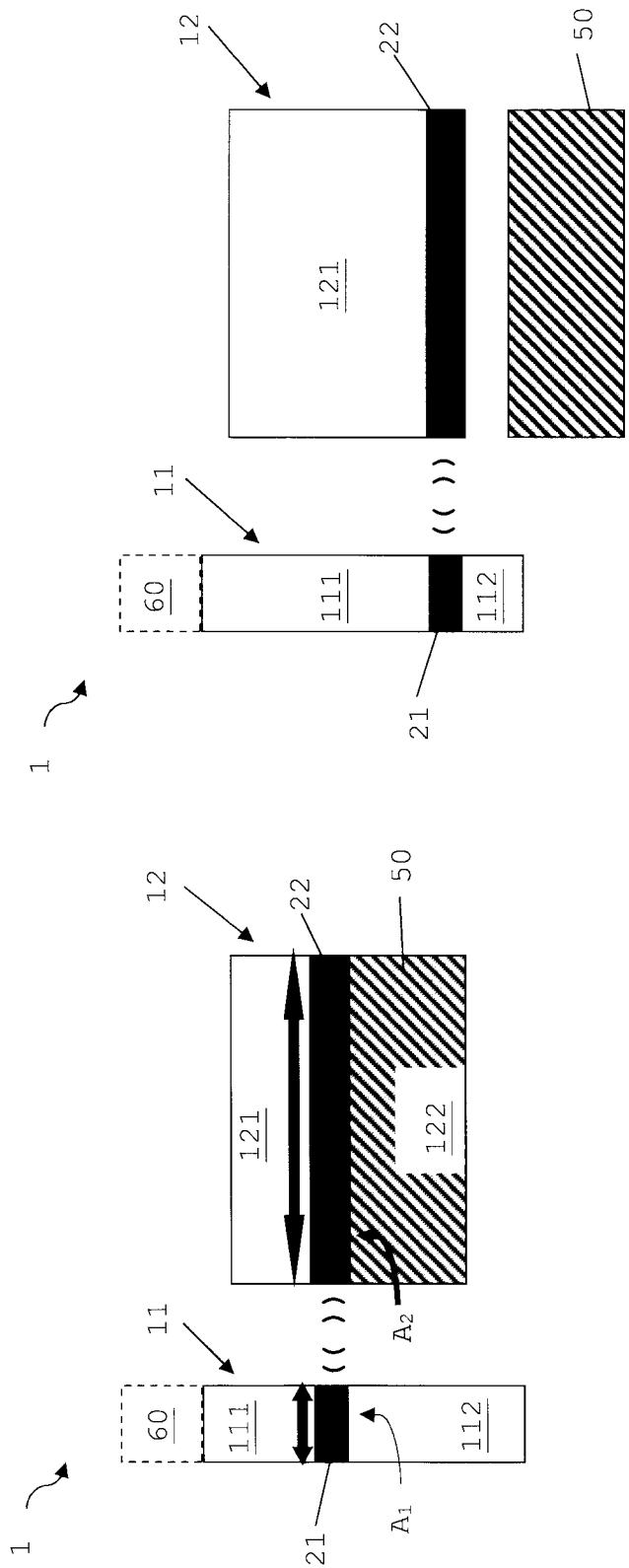

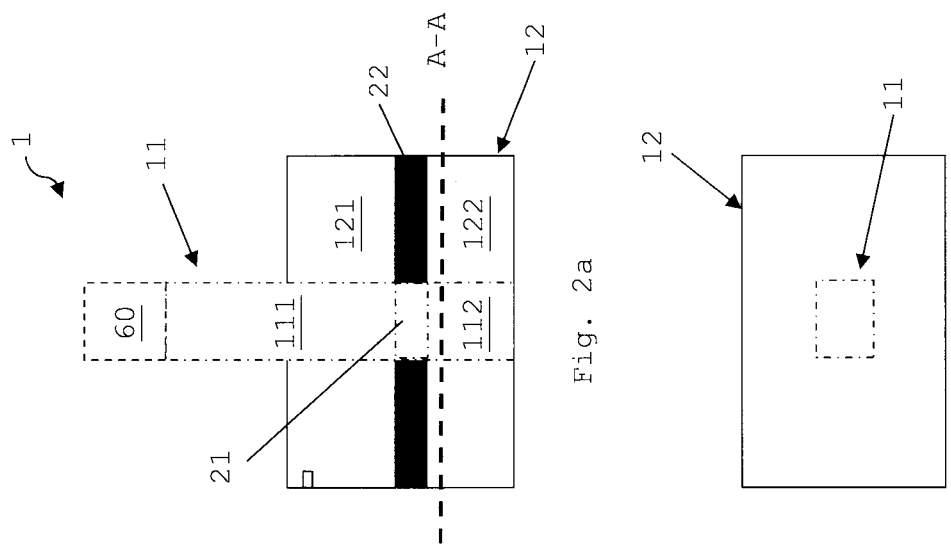
Fig. 2a
Fig. 2b
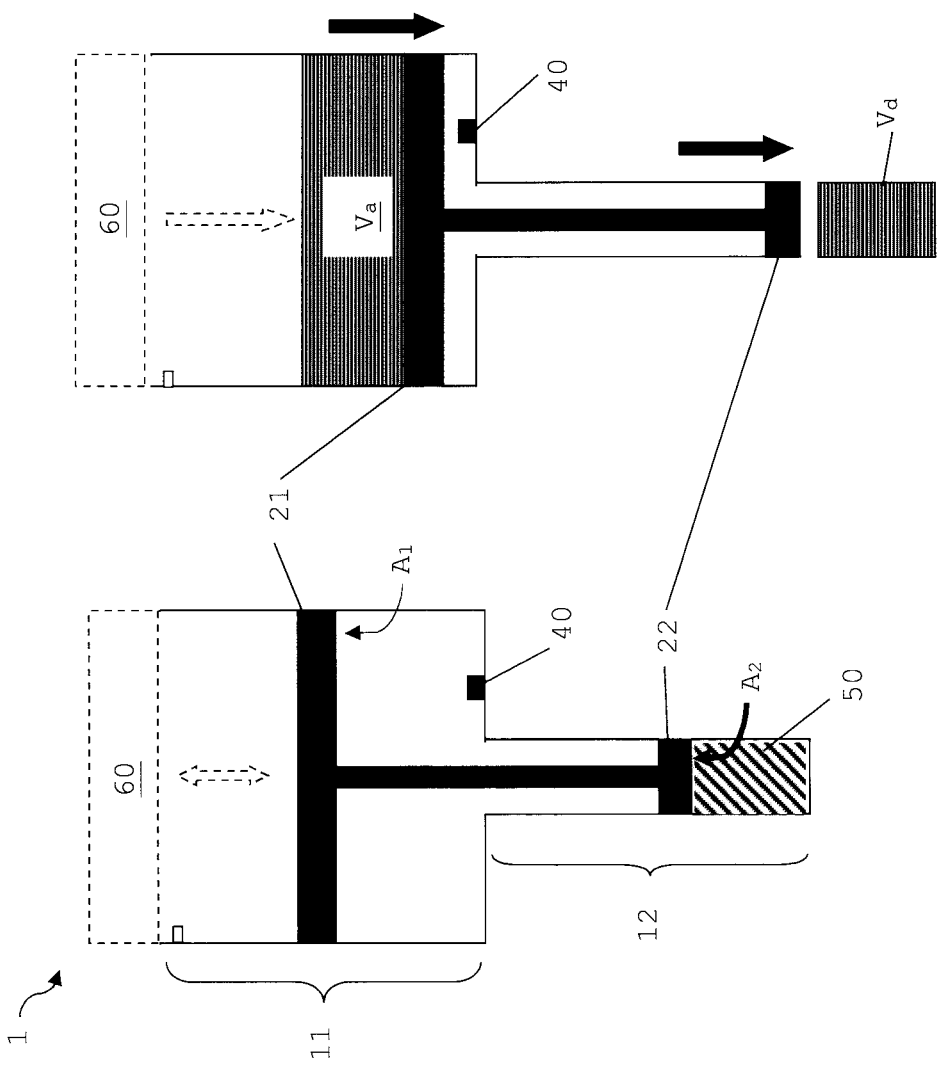
Fig. 3a
Fig. 3b

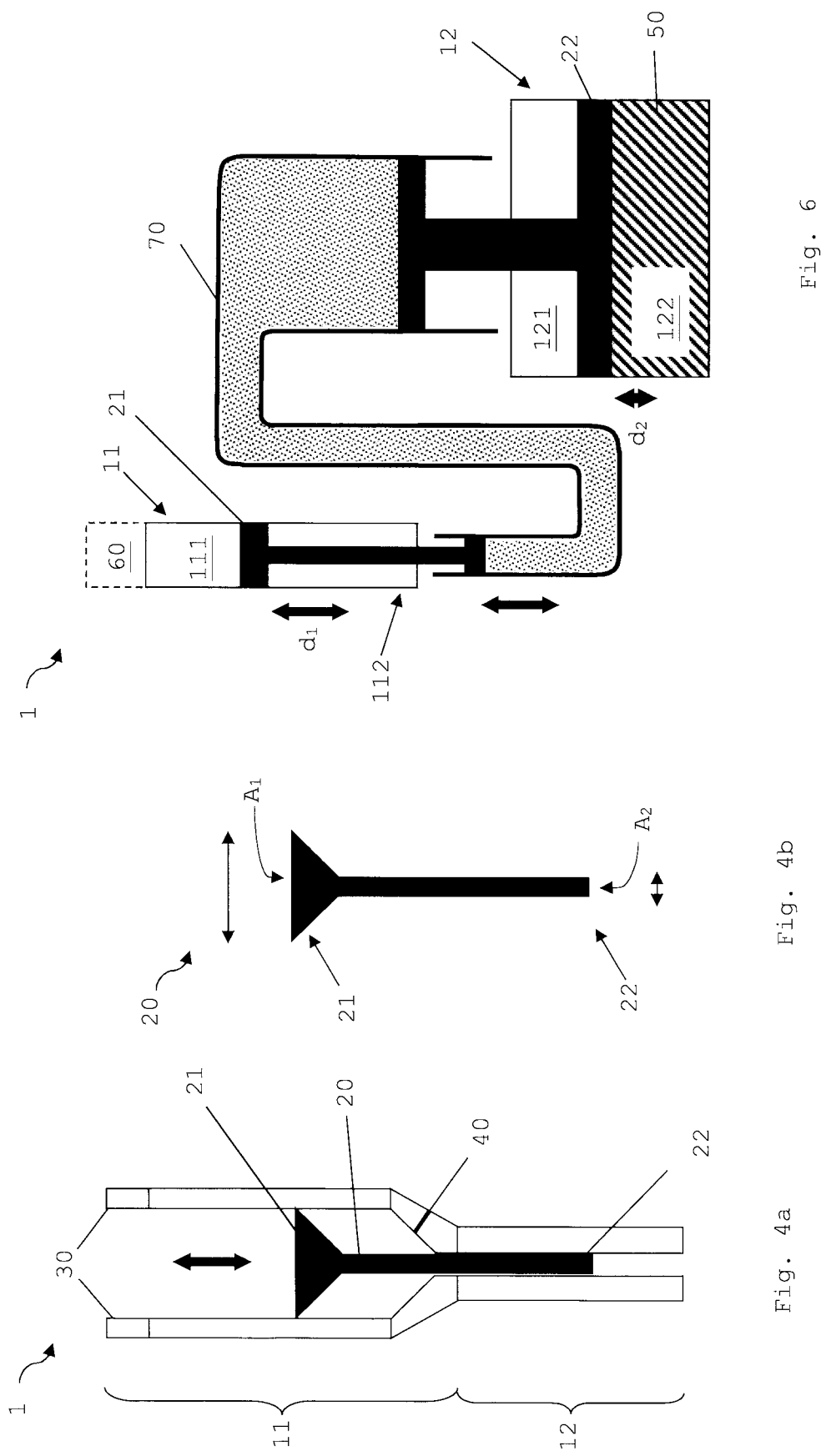

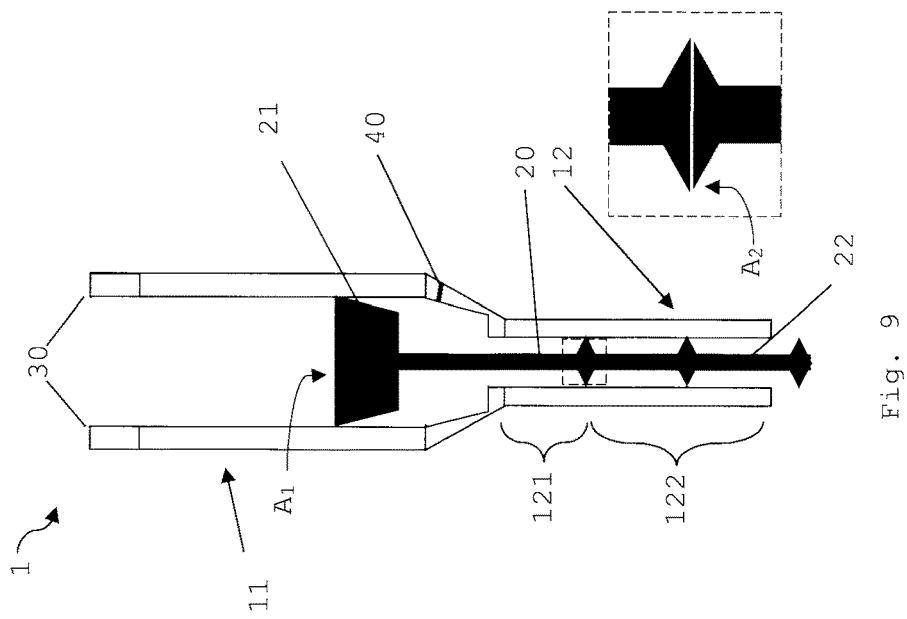
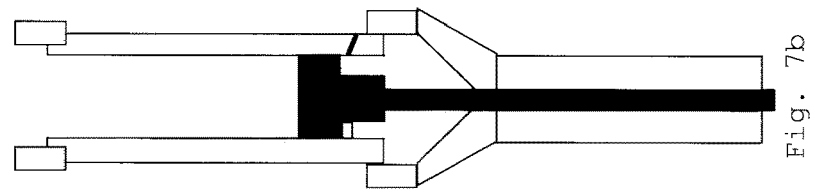
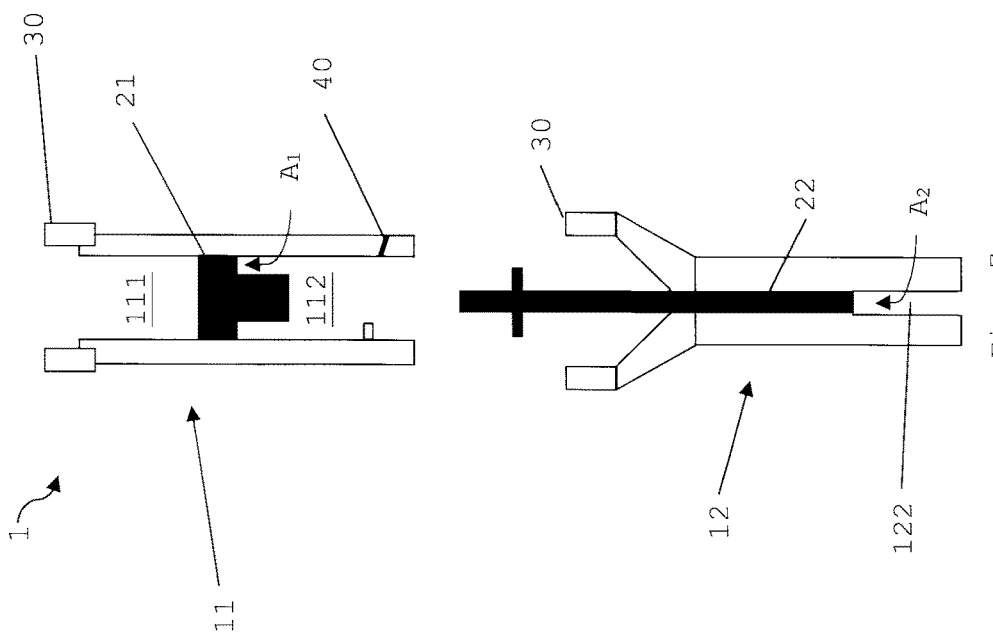

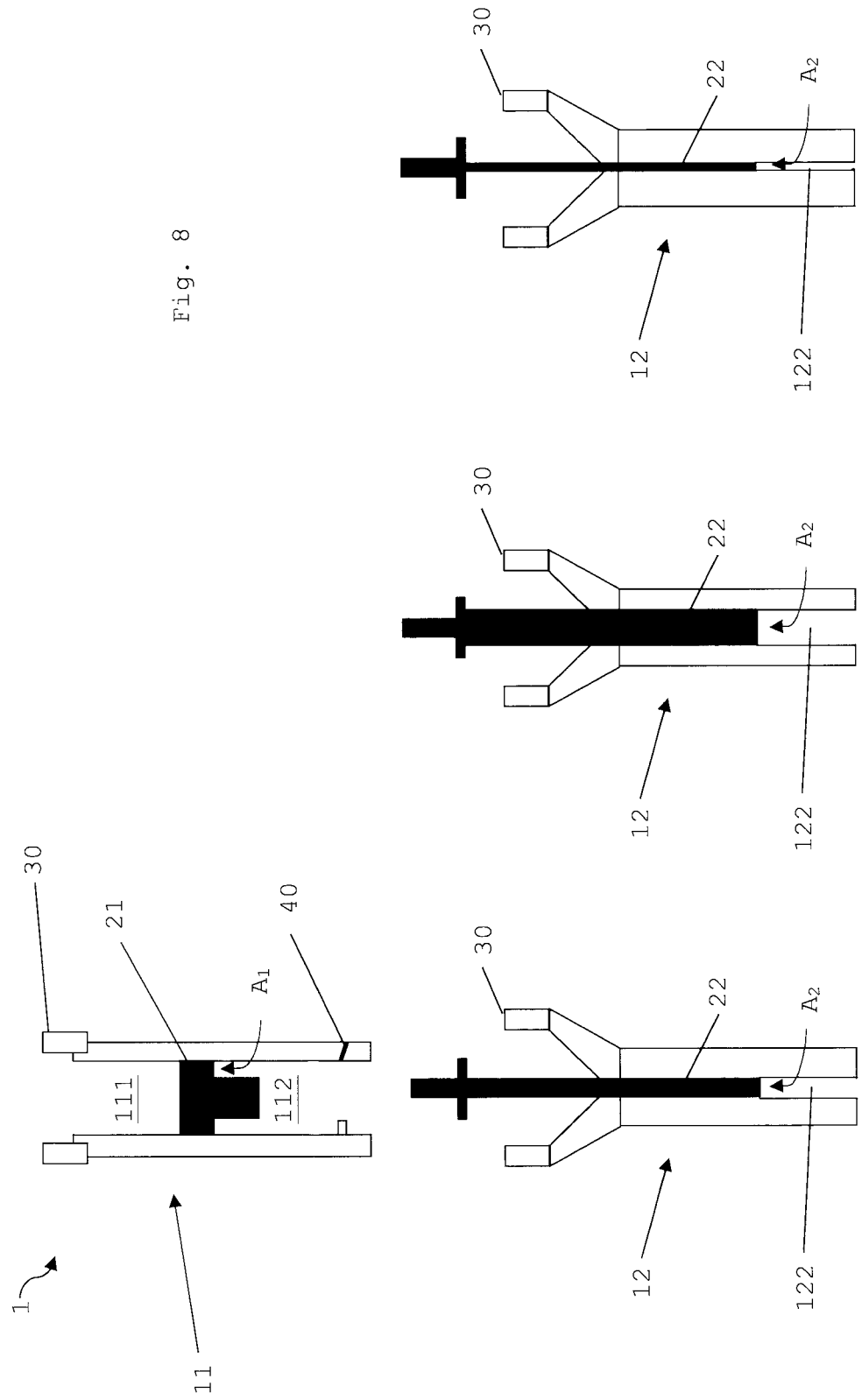

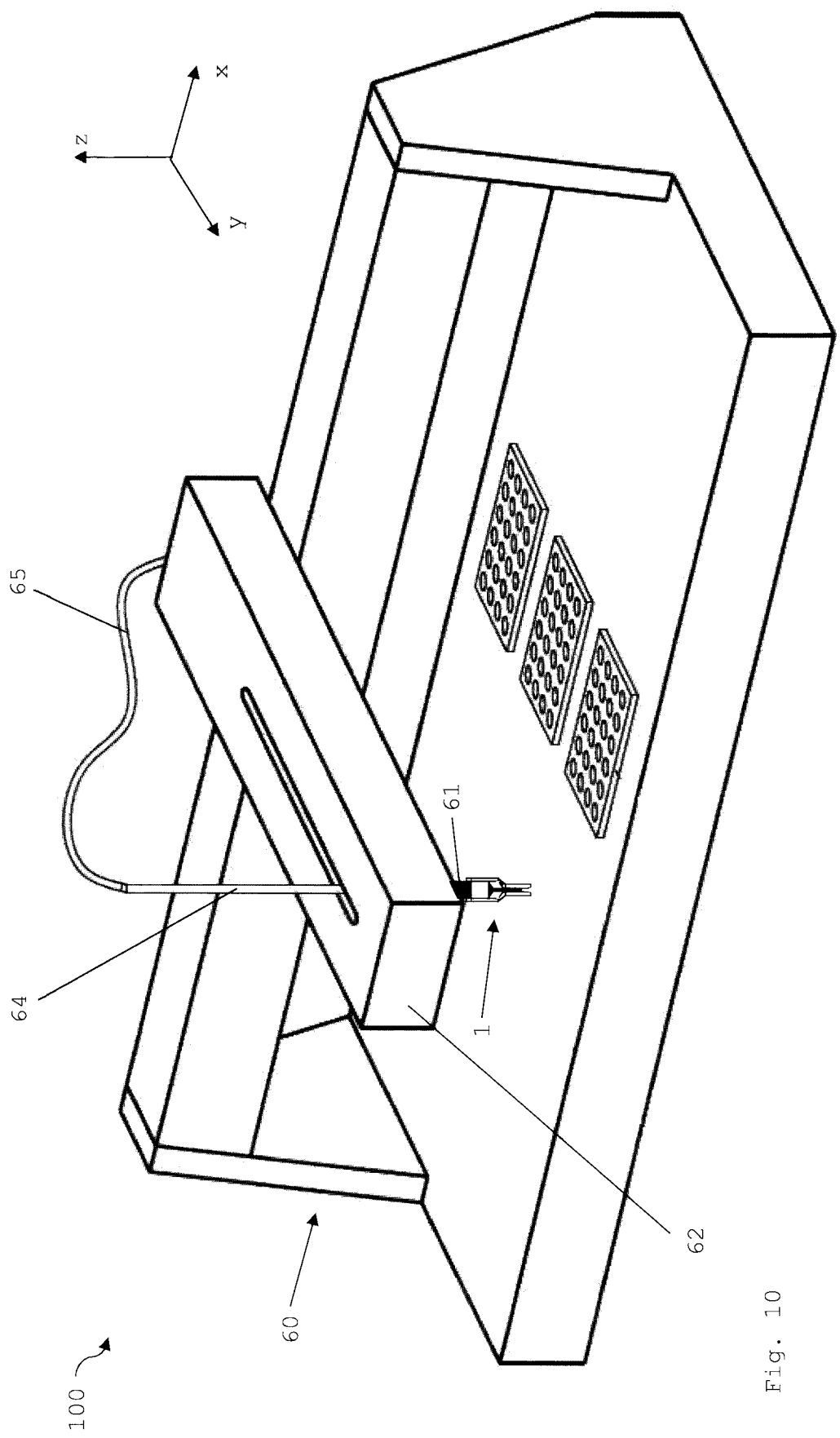

DISPLACEMENT DEVICE AND METHOD FOR DISPLACING FLUID VOLUMES

The present invention relates to the technical field of liquid processing systems, in particular to automated liquid processing systems and is directed to a displacement device for displacing fluid volumes and a pipetting system comprising such a pipetting device. A further aspect of the invention is directed to a method for displacing fluid volumes.

When large quantities of samples have to be examined in medical, chemical, analytical or pharmaceutical laboratories, automated laboratory systems are usually used today to enable rapid and reliable processing of each individual sample. Such laboratory systems are often designed as liquid processing systems for handling liquid volumes. Such liquid processing systems, e.g. air displacement pipetting devices or system liquid pipetting devices, comprise in particular pipettors both for aspirating and dispensing liquids or dispensers exclusively for dispensing liquids. Most laboratory applications require very precise pipetting operations to achieve satisfactory analytical accuracy. In order to guarantee such precise pipetting, the volume ranges in which the automated laboratory systems operate are limited. With common automated laboratory systems, it is not possible to precisely aspirate and precisely dispense liquid volumes that differ by more than a factor 10 or maximum 1000. Consequently, there are automated laboratory systems on the market for larger volumes (e.g. "mL range", such as 0.5 mL to 25 mL) and automated laboratory systems for smaller volumes (e.g. "µL range", such as 0.5 µL to 1000 µL). Furthermore, automated laboratory systems may be limited to a minimum volume or maximum volume that can still be aspirated and dispensed by design. In case a laboratory handles the analysis of samples that require pipetting operations of different liquid volumes, the laboratory is in the need of at least either two different automated laboratory systems operating in different volume ranges or one automated laboratory system comprising various pipettors or pipetting arms.

The objective of the present invention is to make any major adaption to an automated laboratory system superfluous by nonetheless allowing for operating the automated laboratory system in different volume ranges.

This object is achieved by the displacement device according to claim 1, which allows for operating an automated laboratory system designed for a specific volume range in a volume range different from said specific volume range.

A displacement device according to the invention comprises a first fluid space and a second fluid space. The first fluid space is separated into a first chamber and a second chamber by a first piston displacement area of a first piston. The first piston is arranged in a movable manner within the first fluid space. The first chamber of the first fluid space is connectable to a pipetting device. The first piston is actuatable by an actuation volume of the working fluid of the pipetting device. The second fluid space is separated into a first chamber and a second chamber by a second piston displacement area of a second piston. The second piston is arranged in a movable manner within the second fluid space. The second piston is constructed to displace a displacement volume of a fluid located within the second chamber of the second fluid space when the second piston is actuated. The second piston is actuated in dependence on the first piston actuated by the actuation volume. The actuation volume is different from the displacement volume.

The working fluid of the pipetting device can be a gas (such as air, nitrogen, . . . ), a liquid (such as water, oil, . . . ) or a combination thereof. Subsequently, three different types of pipetting devices are explained in more detail to illustrate the operating mode of the displacement device according to the invention in combination with said pipetting devices. Please note that the subsequent illustration is not a conclusive enumeration.

The pipetting device can e.g. be an air pipetting device operating based on the principal of a classical piston-operated pipette that comprises an air cushion between the piston and the liquid to be aspirated or dispensed, the air cushion representing the working fluid. When connected to a displacement device according to the invention, it is the air of the air cushion that gets displaced by the piston of the air pipetting device and in consequence of said displacement actuates the first piston of the displacement device.

The pipetting device can also be a fluid pipetting device. Such a fluid pipetting device can be based on the principal described in e.g. CH 702 974 A1 by means of a motor-driven syringe pump moving a piston of a syringe in a cylinder. A valve, such as a three-way-valve, is operatively connected to the syringe and can be switched by e.g. rotating the three-way-valve. In a first position of the valve, the syringe is in fluid connection with e.g. a system liquid, a system gas or a reagent that flows into the cylinder when the piston is partially withdrawn from the cylinder, the system liquid or system gas representing the working fluid. The valve is then switched into a second position, in which the syringe is in fluid connection with a dispenser tip for dispensing the reagent or a displacement device according to the invention. In case the piston is now moved further into the cylinder, the working fluid or reagent is pressed out of the syringe and led to the dispenser tip or the displacement device according to the invention. Either the reagent gets dispensed or the working fluid actuates the first piston of the displacement device according to the invention. The first piston in the illustrated example is consequently driven by a liquid or a gas (generally summarized by the term fluid) but can also be driven by a combination thereof. In case the syringe comprises some air or any other gas, or a liquid that does not mix with the system liquid before the piston is partially withdrawn from the cylinder in the first position of the valve, this air or gas, or liquid is also led to the displacement device according to the invention and forms an air or gas cushion, or liquid cushion between the first piston of the displacement device and the system liquid. In such cases, the working fluid comprises not only the system liquid or system gas but also the substance forming the cushion. Instead of a syringe pump, it is also possible to control the flow of the working fluid by e.g. a peristaltic pump or a membrane pump.

The pipetting device can also be a pipetting device with a vacuum reservoir and a pressure reservoir as e.g. described in EP2569642. One or more pipetting channels are fluidically connected to both a vacuum source and a pressure source. The individuals pipetting channels are separated from the vacuum source and the pressure source by 2-way valves, respectively. The working fluid of such a pipetting device is e.g. system gas or system gas combined with system liquid. The vacuum of the vacuum reservoir is e.g. provided by a vacuum pump. The vacuum of the vacuum reservoir is assumed to be constant. The pressure reservoir is e.g. provided by a pressure pump. The pressure of the pressure reservoir is assumed to be constant. The pipetting device is operated by opening and closing the 2-way valve between the vacuum reservoir and the pipetting channel and between the pipetting channel and the pressure reservoir.

Based on the time between opening and closing the valve and vice versa ("valving time"), a specific amount of working fluid or lack of working fluid is provided to the pipetting channel. Such a pipetting device is called in this application a valve-controlled pipetting (VCP) device. It is therefore not a piston that moves an air cushion as in a classical piston-operated pipette but overpressure and underpressure that actuate the first piston of the displacement device according to the invention when connected to a VCP pipetting device. Nonetheless, overpressure can e.g. be represented by an amount of pressurized air such that the first piston is again actuated by a working fluid as in the previous examples.

In general, a pipetting device can be understood as any means that provides for aspirating and dispensing a specific volume of a fluid in a controlled manner. It is then this specific volume that provides for the working fluid of the pipetting device, which working fluid acts as or in other words represents or forms the actuation volume for actuating the first piston. The guiding of working fluid of the pipetting device into or the removing of working fluid of the pipetting device from the first chamber of the first fluid space provokes indirectly via the first piston a movement of the second piston and thus the aspiration or dispensation of the displacement volume. By actuating the first piston via the actuation volume, the first piston is driven either pneumatically or hydraulically depending on the working fluid being a gas or a liquid. The working fluid can also be a combination thereof such that the first piston can be actuated pneumatically and hydraulically at the same time. Although the working fluid of the pipetting device itself may be driven mechanically (e.g. by a rigid displacer such as a plunger operated manually or automatically), the first piston is directly and immediately actuated pneumatically and/or hydraulically and not by mechanical coupling, i.e. by a user interface such as a handle or a grip (e.g. an activator grip such as a thumb press) being coupled in a fix or removable manner to the first piston. In other words, the first piston is not coupled (neither in a fix nor removable manner) to a physical (e.g. rigid) means for actuating it. One can say that the force for actuating the first piston is applied contactless, i.e. it is not a solid-state body that is transmitting the force for actuating the first piston. The first piston and preferably also the first chamber of the first fluid space are thus constructed such that the first piston can be actuated pneumatically and/or hydraulically.

Concerning the general design of the first fluid space and the second fluid space, various basic shapes are possible, such as cylindric or cuboid. To avoid any hindering of the pistons' movement, an unvarying cross-sectional shape along the movement path of the pistons is beneficial. Sections of the fluid spaces that do not belong to the movement paths can comprise varying cross-section shapes, such as conical.

The first and second pistons can have various shapes and can be designed as massive or hollow bodies. For instance, a piston can be a continuous body, such as a cylinder, or a body with recesses. The piston displacement area describes the largest cross-sectional area of the pistons body perpendicular to the movement path of the piston. In case of the piston being a continuous body, there is only one cross-sectional area and thus the surface of the piston providing for the smallest second chamber and the largest first chamber is considered the piston displacement area. When the second chamber is located underneath the first chamber, it is the lower surface of the piston that is considered the piston displacement area. This definition holds for both the first and the second piston. In case a piston comprises several sections with an identical maximum cross-sectional area perpendicular to the movement path, it is the cross-sectional area of the first section viewed from the first chamber to the second chamber that represents the piston displacement area.

To be connectable to a pipetting device, in particular to the pipetting tube of such a device, wherein the pipetting tube describes the coupling means of the pipetting device such as the cone for plugging on disposable tips, the first chamber of the first fluid space can comprise a connection means. This connection means can provide e.g. for friction fit or form fit. The connection is preferably established in a gas-tight and/or liquid-tight manner. The first chamber of the first fluid space can for instance comprise on the side facing away from the first piston an opening with an opening section designed in analogy to the opening section of commercial disposable tips that are intended to be stuck to the pipetting tube of a pipetting device. Such a design allows sticking the displacement device to the pipetting tube similar to the sticking of a disposable tip to the pipetting tube, the opening section representing the connection means. The opening section of the first chamber of the first fluid space is for instance a hollow cylinder either with or without a slight conical shape and an opening section diameter of 0.2 cm to 2 cm, in particular of 0.5 to 1 cm. To achieve a friction fit, it is also an option to design the opening section of the first chamber of the first fluid space in an elastic manner e.g. by using an elastic material such as rubber or a polymer to build the opening section, the elastic material representing the connection means. It is also possible to provide a profiled structure on the inner surface of the opening section by means of material risings (e.g. by implementing an o-ring or two or more bulges), material recesses and/or structure bars, the profiled structure representing the connection means. To provide for a form fit, the first chamber of the first fluid space can for instance comprise protrusions designed complementary to recesses of the pipetting tube or vice versa, the protrusions or recesses representing the connection means. Alternatively, the connection can also be provided by magnetic forces or any other known way of connecting two items. The connection between the displacement device and the pipetting device is preferably detachable.

The displacement device works the most reliable when the pistons can be moved with as little friction as possible and when the pistons provide for a fluid-sealing separation of the first chamber and the second chamber. The first condition allows for a smoother movement of the pistons and thus for a better controllable movement. The second condition ensures that the desired volume (i.e. the displacement volume and/or the first volume addressed later on) is displaced by the piston's movement by a predetermined distance. In case some fluid could pass from the first chamber to the second chamber and was not displaced reliable by the piston's movement, it would be hard to predict what the actual volume of the displaced fluid is. It is in particular beneficial when the pistons are in direct contact against the inner wall of the fluid spaces. Both conditions can be influenced by the choice of material for both the pistons and the fluid spaces, in particular for the outer surface of the piston and the inner surface of the fluid spaces, i.e. for the contact area of the pistons and the fluid spaces. Low friction materials such as PTFE may be used. For the first piston not being in contact with the fluid of the second chamber of the second fluid space, i.e. the fluid of interest, it is also an option to use lubricants, such as silicon lubricants having a friction decreasing and a sealing effect. Such lubricants can be provided by adding a small volume of them to the first chamber of the first fluid space. To further improve the reliability of the displacement device, it can be beneficial to use a liquid as working fluid to minimize the compressible amount.

The displacement volume that gets displaced by the second piston is for instance a sample to be analyzed or a reagent or chemical in general. This so-called substance of interest can be a liquid (i.e. liquid of interest) such as e.g. water, puffer, acid and so on or a gas (being summarized together with liquids as fluid of interest).

However, the displacement volume is not limited to fluids and can also include solid materials e.g. in powder form or suspensions. Since the displacement device of the invention will probably predominantly be used to aspirate and dispense fluids, most examples and illustrations address the fluid of interest. This is not to be understood as a limitation of the invention to fluid displacement volumes. The actuation of the first piston is controlled by the volume of the working fluid of the pipetting device, namely the actuation volume. If now the second piston is actuated in dependence on the first piston and thereby displaces a volume that is different from the actuation volume, the actual displacement volume of the fluid of interest is different from the actuation volume predetermined by the pipetting device. In consequence, the displacement device provides for a volume transmission having a transmission ratio given by the ratio of the actuation volume to the displacement volume. The displacement device allows thus for the displacement and also for the aspiration and dispensation of a volume of a fluid of interest different from the volume predetermine by the working fluid of a pipetting device controlling the displacement and also aspiration and dispensation process. Since the volume difference can be of several magnitudes, the displacement device makes purchasing a plurality of pipetting devices of different operation volume ranges or the purchase of a single pipetting device with several pipetting arms, each arm operating in a different volume range, superfluous.

Please note that the displacement device according to the invention does also allow for operating a hand pipette designed for a specific volume range in a volume range different from said specific volume range. The invention and all its aspects are thus not limited to a use in combination with automated laboratory systems. However, the benefit of the invention and all its aspects is larger for automated laboratory systems since they are more expensive and take up far more space than hand pipettes.

In one embodiment of the displacement device according to the invention, which may be combined with any of the preaddressed embodiments and any of the embodiments still to be addressed unless in contradiction, is the first piston constructed to displace a first volume of a fluid located within the second chamber of the first fluid space. The first volume is in particular of the same size than the actuation volume.

According to this embodiment, the first piston is constructed to displace a first volume of a fluid located within the second chamber of the first fluid space when the first piston is actuated by an actuation volume of the working fluid of the pipetting device. The first volume that gets displaced by the first piston is for instance ambient air or any kind of system fluid and is not consumed during the analytical procedure.

Since the actuation of the first piston is controlled by the actuation volume, the first volume that gets displaced by the first piston is also controlled by the actuation volume, preferably such that the size of the first volume is equivalent to the size of the actuation volume. Such an equality is given when none of the fluid (e.g. air or liquid) of the actuation volume can pass the barrier provided by the first piston. In this case, the displacement device provides for a volume transmission having a transmission ratio given by the ratio of the first volume to the displaced volume, the transmission ratio being identical to the transmission ratio given by the ratio of the actuation volume to the displacement volume.

In one embodiment of the displacement device according to the invention, which may be combined with any of the preaddressed embodiments and any of the embodiments still to be addressed unless in contradiction, is the second piston a positive displacement piston.

Implementing the second piston as a positive displacement piston is in particular beneficial for the reliable displacement of small volumes, e.g. for displacement volumes in the range of 10 nL to 500 nL. In case the second piston is a positive displacement piston, the first fluid chamber of the second fluid space contains a part or even the whole second piston and is thus not an empty space only filled with ambient air or alike as it is the case for other embodiments.

In one embodiment of the displacement device according to the invention, which may be combined with any of the preaddressed embodiments and any of the embodiments still to be addressed unless in contradiction, is the actuation of the second piston in dependence on the first piston based on at least mechanical coupling and/or magnetic force and/or pneumatic force and/or hydraulic force.

To control the movement of the second piston, several physical principals may be implemented, either alone or in combination. One principal is based on mechanical coupling between the first and the second piston. This is a simple as well as effective and non-costly principle. Another principle is based on attractive forces and/or repulsive forces, in particular based on magnetic forces. However, it is also possible to pneumatically and/or hydraulically couple the first and the second piston in order to determine the movement of the second piston dependent on the movement of the first piston. In one example, the actuation of the second piston in dependence on the first piston is not based on mechanical coupling, e.g. a rigid or solid connection between the first and the second piston.

In one embodiment of the displacement device according to the invention, which may be combined with any of the preaddressed embodiments and any of the embodiments still to be addressed unless in contradiction, is the first piston either removably or permanently mechanically connected to the second piston.

Depending on the overall design of the displacement device, one or the other may be more preferred. If the first and the second fluid space of the displacement device are designed in one piece, it may also be advantageous to design the first and the second piston in one piece, i.e. by means of a double piston. However, the displacement device can be designed such that it can be disassembled, and single components can be exchanged. Here a removable mechanical connection between the first and the second piston is beneficial. For instance, the second piston, in particular a second positive displacement piston, can be exchanged together with the second fluid space after each displacement operation to avoid cross contamination.

In one embodiment of the displacement device according to the invention, which may be combined with any of the preaddressed embodiments and any of the embodiments still to be addressed unless in contradiction, is the first fluid space connected to the second fluid space.

The second chamber of the first fluid space can for instance be connected to the first chamber of the second fluid space.

The connection is in particular a fluid-connection. The first fluid space and the second fluid space can e.g. be arranged centric to each other along a joint centric axis or at least in parts next to each other. The connection can be implemented by a smooth or seamless transition from the first fluid space to the first chamber of the second fluid space. Such a design may simplify the manufacturing of the displacement device. In case the second chamber of the first fluid space is connected to the first chamber of the second fluid space, there is no mandatory sharp boarder between the first fluid space and the second fluid space but rather a smooth diffuse transition. The second chamber of the first fluid space and the first chamber of the second fluid space merge and form one large chamber. Since this large chamber can at any time be artificially separated into the second chamber of the first fluid space and the first chamber of the second fluid space although there is not necessarily a physical boundary, there is no discrepancy to the wording of claim 1.

In one embodiment of the displacement device according to the invention, which may be combined with any of the preaddressed embodiments and any of the embodiments still to be addressed unless in contradiction, are the first fluid space and the second fluid space removably connected or permanently connected.

A permanent connection of the first fluid space to the second fluid space allows for a simple one-piece design of the displacement device. A non-permanent and thus detachable connection of the first fluid space to the second fluid space allows for an exchange of the single components and also for the provision of a displacement device set comprising e.g. of a first fluid space adapted to the possible actuation volumes of the pipetting devices it is meant to be used with and a number of at least two second fluid spaces providing for the displacement of different actual displacement volumes.

In case of a non-permanent connection, it is even possible that the pipetting device, in particular the pipetting tube, provides the first fluid space and that the first fluid space is permanently attached thereto. It is also possible that the first fluid space is designed as semi disposable and gets e.g. exchanged after a certain number of uses (e.g. 100) or after each full pipetting run. The fluid path, being a consequence of the fluid connection between the first fluid space and the second fluid space when connected, could be controlled by means of a valve, the valve defining in terms of a mechanical intersection the transition from the first fluid space to the second fluid space (e.g. second fluid space being a positive displacement tip).

In one embodiment of the displacement device according to the invention, which may be combined with any of the preaddressed embodiments and any of the embodiments still to be addressed unless in contradiction, is the second fluid space at least in parts formed by a standard positive displacement tip.

This embodiment allows on the one hand for integrating standard positive displacement in the manufacturing process of the displacement device by e.g. using them as prefabricated second fluid spaces. On the other hand, it is e.g. possible to use the first fluid space various times an replace the second fluid space, namely the standard positive displacement tip, after each pipetting operation to avoid contamination.

In one embodiment of the displacement device according to the invention, which may be combined with any of the preaddressed embodiments and any of the embodiments still to be addressed unless in contradiction, controls the first piston the movement of the second piston such that the second piston cannot enter the second chamber of the first fluid space.

In case the first fluid space is meant to be used during several pipetting operations, this embodiment prevents any contact of the fluid of interest and the first fluid space and thus any potential contamination. It is only the second fluid space that gets in contact with the fluid of interest and may therefore need cleaning or replacement between single pipetting operations.

In one embodiment of the displacement device according to the invention, which may be combined with any of the preaddressed embodiments and any of the embodiments still to be addressed unless in contradiction, comprises the second chamber of the first fluid space and/or the first chamber of the second fluid space a pressure equilibrium means.

The pressure equilibrium means may be designed as one or more openings (e.g. through-holes), one or more pressure control valves, one or more elastic sections (e.g. comparable to a balloon or alike) and so on. In one example, the pressure equilibrium means is not designed as (solely or exclusively) one or more openings. In another example, the pressure equilibrium means is not designed as one or more fluid ports. The pressure equilibrium means makes sure that when the first fluid space and the second fluid space, in particular the second chamber of the first fluid space and the first chamber of the second fluid space, are connected in a sealing, i.e. fluid-tight, manner that the movement of the second piston is still dependent on the movement of the first piston and not on the volume of the fluid that gets displaced by the first piston during its movement, namely the first volume.

In one embodiment of the displacement device according to the invention, which may be combined with any of the preaddressed embodiments and any of the embodiments still to be addressed unless in contradiction, is the actuation volume larger than the displacement volume. The actuation volume is in particular between 10 to 1000 times, further in particular between 50 to 500 times, larger than the displacement volume.

When the actuation volume is larger than the displacement volume, it is possible to aspirate and dispense a volume of a fluid of interest that is smaller than the actuation volume and thus smaller than the volumes the pipetting device providing the actuation volume is constructed for.

It is for instance possible to aspirate and dispense a volume of a fluid of interest of 50 nL with a pipetting device that is designed for aspirating and dispensing volumes of 50 μL when using a displacement device providing for a transmission ratio defined by the ratio of the actuation volume to the displacement volume of 1000:1. It is of course also possible to provide for an actuation volume that is smaller than the displacement volume and thus allowing for aspirating and dispensing volumes of a fluid of interest larger than the volume the pipetting device is designed for. In such cases the transmission ratio is smaller than 1, e.g. 1:5 enabling the aspiration and dispensation of a volume of a fluid of interest of 5 mL with a pipetting device that is designed for aspirating and dispensing volumes of 1 mL.

In one embodiment of the displacement device according to the invention, which may be combined with any of the preaddressed embodiments and any of the embodiments still to be addressed unless in contradiction, covers the first piston a first distance when being actuated by the actuation volume of the working fluid of the pipetting device. The first distance is identical to a second distance that is covered by the second piston when being actuated in dependence on the first piston.

This embodiment can for instance be realized by means of a double piston, i.e. an object of the first piston, the second piston and a rigid connecting element such as a bar or alike. A movement of the first piston by a certain distance forces the second piston to perform a movement of the same certain distance. An advantage of the equidistant movement is an easier determination of the transmission ratio of the displacement device.

In one embodiment of the displacement device according to the invention, which may be combined with any of the preaddressed embodiments and any of the embodiments still to be addressed unless in contradiction, is the first piston displacement area different in size than the second piston displacement area.

This embodiment although allows for an easier determination of the transmission ratio of the displacement device. When the first distance covered by the first piston and the second distance covered by the second piston is known, the first and second piston displacement areas allow for calculating the volume displaced by the first piston and the second piston, namely the so-called first volume and displacement volume. In most cases a conclusion on the size of the actuation volume can be drawn based on the size of the first volume. If the movement of the first piston and the second piston is synchronous, the transmission ratio corresponds to the ratio of the first piston displacement area to the second piston displacement area.

In one embodiment of the displacement device according to the invention, which may be combined with any of the preaddressed embodiments and any of the embodiments still to be addressed unless in contradiction, is the first piston displacement area larger than the second piston displacement area. The first piston displacement area is in particular between 10 to 1000 times, further in particular between 50 to 500 times, larger than the second piston displacement area.

In consequence, assumed that the movement of the first piston and the movement of the second piston are synchronized, the transmission ratio would be larger than 1, in particular between 10:1 and 1000:1 and further in particular between 50:1 and 500:1.

In one embodiment of the displacement device according to the invention, which may be combined with any of the preaddressed embodiments and any of the embodiments still to be addressed unless in contradiction, comprises the first fluid space and/or the second fluid space an electrode that is constructed to form a measuring capacitor together with a further electrode. It is for instance the first chamber of the first fluid space and/or the second chamber of the first fluid space and/or the first chamber of the second fluid space and/or the second chamber of the second fluid space that comprises an electrode.

The provision of an electrode constructed to form a measuring capacitor together with a further electrode or at least two electrodes to form a measuring capacitor each together with a further electrode allows each for the determination of the actuation volume and/or the first volume and/or the displacement volume depending on the installation location of the electrode or the several electrodes. In particular the actuation volume and further in particular the displacement volume are of significant interest to monitor the reliability of the pipetting operation. The further electrode may be at least in parts aspirated fluid or e.g. the work bench. In case the further electrode is at least in parts formed by the aspirated fluid, the other electrode should be arranged at the second chamber of the second fluid space. Alternatively, the displacement volume and/or the actuation volume and/or first volume can be determined indirectly by determining the position of the first piston and/or the second piston. For this purpose, the piston(s) is(are) designed at least in parts as movable electrode(s) or movable dielectric(s). Monitoring the position of at least one piston, in particular the first piston, can be beneficial in view of varying frictional forces caused by production tolerances and allow for closed loop control of the piston and thus prevent abrupt piston movements. Furthermore, a fresh pipette tip is often used to handle a new sample. Such pipette tips are therefore designed for one-time use and are usually referred to as "disposable pipette tips" (abbreviated to "DiTis"). Depending on the pipetting operation, different pipette tips are used for pipetting.

It is therefore beneficial that an automated pipetting device is capable of detecting whether a pipette tip is connected to the pipette tube at all and, in particular, whether the correct pipette tip is connected. Further information concerning the capacitive volume determination and the determination of the presence and the kind of pipette tip can be derived from e.g. WO 2018/015419 A1 or WO 2018/015421 A1.

A further aspect of the invention addresses the provision of a pipetting system comprising a pipetting device and at least one displacement device according to the invention. The pipetting device is for instance an air pipetting device, a fluid pipetting device, an VCP pipetting device, or a combination thereof. The displacement device is connected to the pipetting device. The displacement device is for instance removably stuck to a pipette tube of the pipetting device.

To avoid any modifications of the pipetting device when using it with a displacement device according to the invention, it is beneficial to arrange the displacement device at the pipetting device similar to a standard pipetting tip, namely by sticking a first section onto a pipetting tube of the pipetting device. Instead of aspirating and dispensing a fluid of interest directly, the pipetting device is driving via the working fluid of the pipetting device the first piston of the first fluid space and therewith the second piston of the second fluid space which is then aspirating and dispensing the fluid of interest such that the fluid of interest is indirectly aspirated and dispensed by the pipetting device.

An even further aspect of the invention addresses the provision of a method for displacing a displacement volume of a fluid. The method comprises moving a first piston that is arranged in a movable manner within a first fluid space. The first fluid space is separated into a first chamber and a second chamber by the first piston. The moving of the first piston is actuated by an actuation volume of the working fluid of a pipetting device. The method comprises further moving a second piston that is arranged in a movable manner within a second fluid space. The second fluid space is separated into a first chamber and a second chamber by the second piston such that a displacement volume of a fluid located within the second chamber of the second fluid space is displaced. The moving of the second piston is actuated in dependence on the moving of the first piston. The moving of the first piston is actuated by the actuation volume and the actuation volume is different from the displacement volume.

This method allows, in a manner comparable to the displacement device, for the displacement of a volume of a fluid of interest that is different from the volume the pipetting device driving the movement of the first piston is designed for. Again, the actuation volume is based on the working fluid of the pipetting device and is responsible for the actuation of the first piston such that the moving of the first piston can be described as a pneumatic and/or hydraulic moving. One can say that actuating the first piston is performed contactless, i.e. the actuation is not performed by a solid-state body transmitting an actuation force to the first piston.

In one embodiment of the method according to the invention, which may be combined with any of the preaddressed embodiments and any of the embodiments still to be addressed unless in contradiction, is the moving of the first piston that is arranged in a movable manner within the first fluid space performed such that a first volume of a fluid located within the second chamber of the first fluid space is displaced.

In one embodiment of the method according to the invention, which may be combined with any of the preaddressed embodiments and any of the embodiments still to be addressed unless in contradiction, the method comprises further connecting the first chamber of the first fluid space to an pipetting device, in particular an air pipetting device, a fluid pipetting device, an VCP pipetting device, or a combination thereof. The connecting is performed in particular by means of removable sticking at least a first section of the first chamber to a pipette tube of the pipetting device.

In one embodiment of the method according to the invention, which may be combined with any of the preaddressed embodiments and any of the embodiments still to be addressed unless in contradiction, comprises moving the second piston an actuating of the second piston by mechanical coupling and/or magnetic force and/or pneumatic force and/or hydraulic force.

Another aspect of the invention addresses a displacement device set. The set comprises at least one displacement device according to the invention and at least one further second fluid space. This further second fluid space is designed combinable with the first fluid space of the at least one displacement device. The first fluid space of the at least one displacement device is designed separately from the second fluid space of the at least one displacement device. The at least one further second fluid space is separated into a first chamber and a second chamber by the second piston displacement area ($A_2$) of a second piston arranged in a movable manner within the further second fluid space. The further second fluid space comprises a second piston displacement area ($A_2$) that is different in size, e.g. smaller or larger, than the second piston displacement area ($A_2$) of the second fluid space of said at least one displacement device.

By exchanging the second fluid space of the displacement device with the further second fluid space provided in the set, it is possible to aspirate and dispense different displacement volumes having a different volume transmission when set into relation with the actuation volume.

A further aspect of the invention addresses the use of a pipetting system according to the invention, the use of a method according to the invention and/or the use of a displacement device according to the invention and/or the use of a displacement device set according to the invention for translating a first fluid volume to a second fluid volume. These addressed first fluid volume and second fluid volume are for instance represented by the actuation volume $V_a$ and the displacement volume $V_d$ or the first volume $V_1$ and the displacement volume $V_d$.

An even further aspect of the invention addresses the use of a pipetting system according to the invention, the use of a method according to the invention and/or the use of a displacement device according to the invention and/or the use of a displacement device set according to the invention for displacing a displacement volume $V_d$ by means of a pipetting device being constructed to displace an actuation volume $V_a$, said actuation volume $V_a$ having a different volume than said displacement volume $V_d$.

Figure 5B:
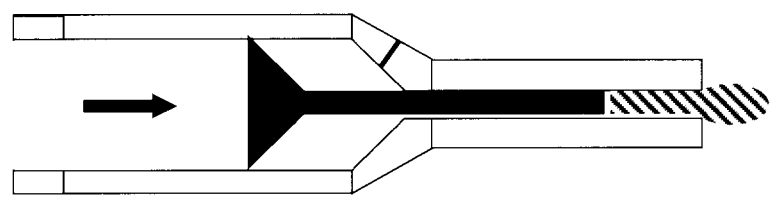
Figure 5A:
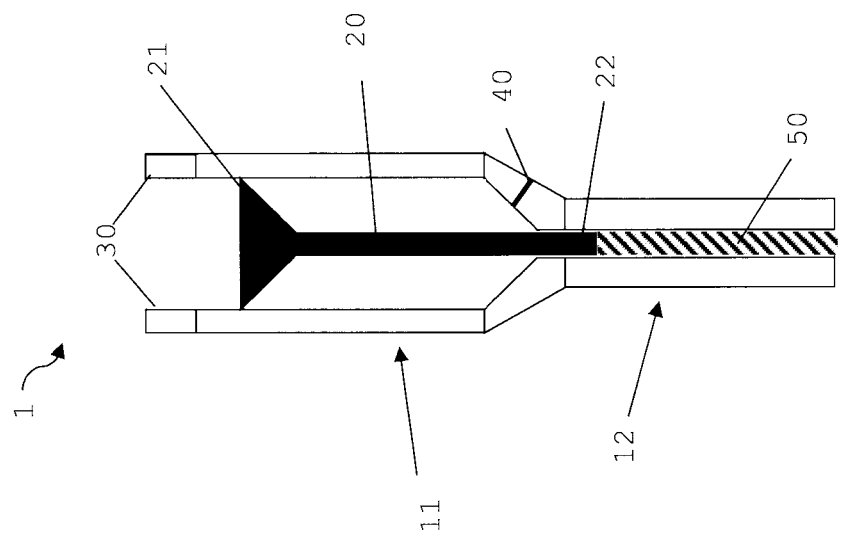
Figure 12B:
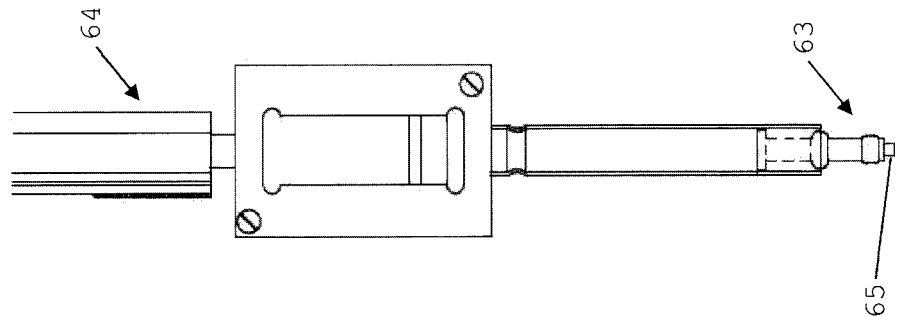
Figure 12A:
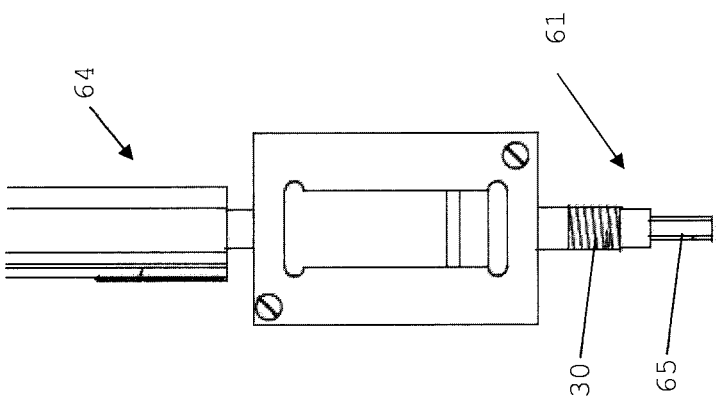
Figure 11:
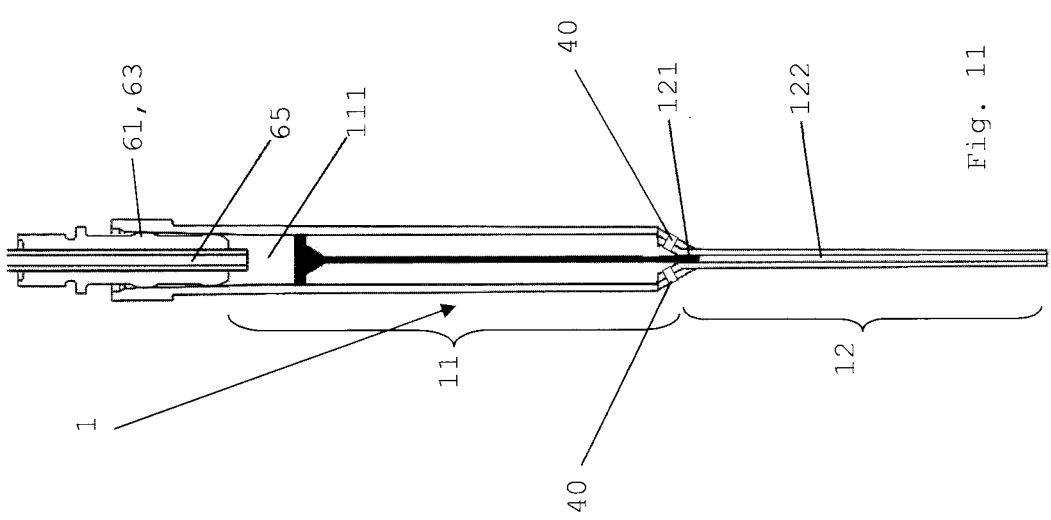

The invention shall now be further exemplified with the help of figures. The figures schematically show:

FIG. 1a a displacement device according to the invention;

FIG. 1b the displacement device of FIG. 1a displacing a fluid of interest;

FIG. 2a an embodiment of a displacement device according to the invention;

FIG. 2b a cross-sectional top view of the displacement device of FIG. 2a;

FIG. 3a a further embodiment of a displacement device according to the invention;

FIG. 3b the displacement device of FIG. 3a displacing a fluid of interest;

FIG. 4a a even further embodiment of a displacement device according to the invention;

FIG. 4b the double piston of the displacement device of FIG. 4a;

FIG. 5a the displacement device of FIG. 4a having a fluid of interest aspirated;

FIG. 5b the displacement device of FIG. 4a displacing a fluid of interest;

FIG. 5c the displacement device of FIG. 4a further displacing a fluid of interest;

FIG. 6 an embodiment of a displacement device according to the invention;

FIG. 7a an embodiment of a displacement device in two-piece design;

FIG. 7b the displacement device of FIG. 7a in assembled state;

FIG. 8 a displacement device set;

FIG. 9 an embodiment of a displacement device for displacing powder;

FIG. 10 a pipetting system comprising a pipetting device and a displacement device according to the invention;

FIG. 11 an embodiment of a displacement device according to the invention coupled to a pipetting tube of a pipetting device;

FIG. 12a a pipetting arm having a pipetting tube suitable for coupling with a displacement device according to the invention; and FIG. 12b a pipetting arm comprising an adapter for coupling with a displacement device according to the invention.

FIG. 1a shows a displacement device 1 according to the invention. The displacement device 1 comprises a first fluid space 11 and a second fluid space 12. In the illustrated embodiment, the first fluid space 11 and the second fluid space 12 are designed separately and are thus not in fluid-connection or any other physical connection. The first fluid space 11 is separated into a first chamber 111 and a second chamber 112 by a first piston displacement area $A_1$ of a first piston 21. The second fluid space 12 is also separated into a first chamber 121 and a second chamber 122 by a second piston displacement area $A_2$ of a piston, namely the second piston 22.

The first chamber 111 of the first fluid space 11 is connectable to a pipetting device 60 drawn in dashed lines to indicate that the pipetting device 60 is not part of the displacement device 1. The pipetting device 60 is, for instance, an air pipetting device or a fluid pipetting device. The second chamber 112 of the first fluid space 11 can be filled with a fluid such as a system liquid or a system gas, but it can also be filled with ambient air. The second chamber 112 of the first fluid space 11 may comprise a pressure equilibrium means (not shown here) to avoid any negative impact on the mobility of the first piston 21. For instance, such a pressure equilibrium means can comprise one or more through holes, e.g. realized by means of a large opening of any shape at the bottom of the second chamber 112 of the first fluid space 11, or a valve. Alternatively, the second chamber 112 of the first fluid space 11 can partially be made of an elastic material also allowing for a pressure equilibrium.

To move the first piston 21, working fluid of the pipetting device, such as air of the air pipetting device or fluid (includes liquid, gas or combination thereof) of the fluid pipetting device, is either guided into or removed from the first chamber 111 of the first fluid space 11. By removing working fluid of the pipetting device from the first chamber 111, the first piston 21 is lifted such that the volume of the second chamber 112 is increased and the volume of the first chamber 111 is decreased. By guiding working fluid of the pipetting device into the first chamber 111, the first piston is pushed downwards such that the volume of the second chamber 112 is decreased and the volume of the first chamber 111 is increased.

Since the actuation of the second piston 22 depends on the first piston 21, and therefore also on the movement of the first piston 21, the guiding of working fluid of the pipetting device into or the removing of working fluid of the pipetting device from the first chamber 111 of the first fluid space 11 provokes indirectly via the first piston 21 a movement of the second piston 22. A lift of the second piston 21 leads to a decrease of the first chamber 121 of the second fluid space 12 and an increase of the second chamber 122 of the second fluid space 12. When the second chamber 122 of the second fluid space 12 is in fluid-connection to a fluid of interest 50 (e.g. an analytical sample or any liquid consumable) while the second piston 22 is lifted, a volume of the fluid of interest 50 is aspirated. When the second chamber 122 of the second fluid space 12 comprises some fluid of interest 50 while the second piston 22 is pushed down, a volume of the fluid of interest 50 is dispensed, i.e. displaced. FIG. 1b illustrates the displacement of the fluid of interest 50.

In the shown embodiment, the first piston 21 and second piston 22 are magnetically coupled such that a downward movement of the first piston 21 provokes an identical downward movement, i.e. a simultaneous movement covering the same distance, of the second piston 22.

Since the first piston 21 comprises a first piston displacement area $A_1$ (largest cross-sectional area and in this embodiment also only cross-sectional area since it is an unvarying cross-sectional area; schematically illustrated by a double arrow above the corresponding piston) that is smaller than the second piston displacement area $A_2$ of the second piston 22 (cross sectional area also indicated schematically by a double arrow), a smaller volume is displaced when the first piston 21 is moved downwards by a certain distance compared to when the second piston 22 is moved by the same certain distance in the same direction. The displacement device 1 does therefore provide for a transformation of fluid volumes. In the shown embodiment, the first piston displacement area $A_1$ of the first piston 21 is 10 times smaller than the second piston displacement area $A_2$ of the second piston 22. This means that when the pipetting device 60 is set to displace a volume of e.g. 1 mL and in consequence moves the first piston 21 by e.g. 2 cm, the second piston 22 displaces a volume of 10 mL when being moved by 2 cm. The resulting transformation ratio is thus 1:10 and a pipetting device 60 that is designed to aspirate and dispense sample volumes of between 1 mL to 10 mL is capable by means of the displacement device 1 of this embodiment to aspirate and dispense volumes of 10 mL to 100 ml without the need of any adjustment of the pipetting device 60 at all.

FIG. 2a shows an embodiment of a displacement device 1 according to the invention. Its general set-up is comparable to the set-up of the displacement device shown in FIGS. 1a and 1b. However, the first fluid space 11 of the displacement device 1 illustrated here is partially surrounded by the second fluid space 12, although there is no fluid-connection between the first fluid space 11 and the second fluid space 12. A physical connection between the first fluid space 11 and the second fluid space 12 can exist but is not necessary. To indicate that the section surrounded by the second fluid space 12 is normally not visible, the first fluid space 11 and the first piston 21 are drawn in dashed lines. The first piston 21 separating the first chamber 111 of the first fluid space 11 from the second chamber 112 of the first fluid space 11 and the second piston 22 separating the first chamber 121 of the second fluid space 12 from the second chamber 122 of the second fluid space 12 are in alignment representing a simultaneous movement of the two pistons 21, 22 and thus one way of moving the second piston 22 in dependence on moving the first piston 21, the first piston 21 being actuatable by the pipetting device 60. FIG. 2b shows a top view of a cross section along section A-A of the displacement device 1 of FIG. 2a in order to demonstrate how the first fluid space 11 is surrounded or enclosed by the second fluid space 12. It is of course also possible to choose a design of a displacement device where the second fluid space is partially or completely surrounded or enclose by the first fluid space. The first fluid space 11 and the second fluid space 12 of the shown embodiment of the displacement device 1 comprise both a rectangular cross section.

FIG. 3a shows a further embodiment of a displacement device 1 according to the invention, the displacement device 1 having aspirated some fluid of interest 50. The displacement device 1 comprises a first fluid space 11 being in fluid-connection with a second fluid space 12. The first fluid space 11 is divided into two chambers by a first piston displacement area $A_1$ of a first piston 21, the second fluid space 12 is divided into two chambers by a second piston displacement area $A_2$ of a second piston 22. The first piston 21 and the second piston 22 are mechanically coupled such that an actuation of the first piston 21 by a fluid (e.g. gas, such as air, and/or liquid, such as water) provided by a pipetting device 60 provokes an actuation of the second piston 22. The first fluid space 11 comprises a pressure equilibrium means 40 that is arranged on the one hand such that a fluid getting displaced by a downwards movement of the first piston 21 does not influence the actuation of the second piston 22 and on the other hand such that an upwards movement of the first piston 21 is not blocked by the creation of underpressure. Furthermore, the first fluid space 11 comprises means for limiting the movement of the first piston 21 (and thus for limiting the movement of the second piston 22 due to their mechanical coupling) in form of a protrusion located in the first chamber of the first fluid space 11. The protrusion prevents a further uplifting of the first piston 21 that would cause the second piston 22 to leave the second fluid space 12 and enter the first fluid space 11. Such a means for limiting the movement could e.g. also be arranged at the threshold of the first fluid space 11 to the second fluid space 12 and thus directly hindering the movement of the second piston 22. It is also possible to implement means for limiting the movement of the first piston 21 in both the first chamber and the second chamber of the first fluid space 11 in order to e.g. define a maximum first volume and thus being able to transfer friction-independent always the same maximum volume. FIG. 3b illustrates that the displacement device 1 of this embodiment is designed for displacing a displacement volume $V_d$ that is smaller than the actuation volume $V_a$ provided by the pipetting device 60.

FIG. 4a shows an even further embodiment of a displacement device 1 according to the invention. The double piston 20 of the displacement device 1 with the first piston displacement area $A_1$ of its first piston 21 and the second piston displacement area $A_2$ of its second piston 22 is shown in FIG. 4b. The cross-sectional areas belonging to the displacement areas are schematically illustrated by double arrows. The first piston displacement area $A_1$ represents the largest cross-sectional area of the first piston 11, wherein the second piston displacement area $A_2$ represents the lower surface of the second piston 22 since it comprises a constant cross-sectional area. The displacement device 1 comprises a first fluid space 11 and a second fluid space 12 being connected to each other, both fluid-connected and physically connected. The first fluid space 11 has a cross-sectional area being larger than the cross-sectional area of the second fluid space 12. The cross-sectional area of the first fluid space 11 and the cross-sectional area of the second fluid space 12 are essentially identical to the first piston displacement area $A_1$ of the first piston 21 and the second piston displacement area $A_2$ of the second piston 22 respectively. The rigid connection bar connecting the first piston 21 to the second piston 22 make sure that a movement by a certain distance in one direction of the first piston 21 provokes a predetermined movement of the second piston 22 by the same certain distance in the same direction. In other words, the second piston 22 is mechanically actuated by the first piston 21. The first piston 21 on the other hand is actuated by a fluid provided by a pipetting device (not shown here). The displacement device 1 is configured such that it is connectable in a fluid-tight manner to a standard pipetting device well known in the art. For this purpose, the displacement device 1 comprises connection means 30. In this embodiment the opening section of the first fluid space 11 is designed complementary to at least a part of the free ending of a pipetting tube of a standard pipetting device, the opening section representing the connection means 30. Such a pipetting device can move the first piston 21 either up or down, such movements being illustrated by the double arrow. The first piston 21 is located within the first fluid space 11 such that a downwards movement of the first piston 21 displaces fluid, in particular air, located in the first fluid space 11. To avoid that said displaced fluid, instead of the mechanical coupling of the first piston 21 to the second piston 22, provokes an actuation of the second piston 22 being located within the second fluid space 12, a pressure equilibration means 40, such as one or several holes, are arranged in the lower part of the first fluid space 11.

FIG. 5a to FIG. 5c illustrate how a fluid of interest 50 gets dispensed by a displacement device 1, e.g. by a displacement device designed similar to the one shown in FIG. 4a. The reference signs are only displayed in FIG. 5a for reasons of clarity. The second fluid space 12 of the displacement device 1 comprises some fluid of interest 50 that has previously been aspirated. By actuating the double piston 20 resulting in a downwards movement (indicated by the black arrow), namely towards the second chamber of the second fluid space 12, a part of the aspirated fluid of interest 50 gets positively displaced (see FIG. 5b). By actuating the double piston 20 further to a maximum, in this embodiment until the physical blocking of the first piston 11, the complete volume of the fluid of interest 50 gets dispensed since the second piston 22 is designed such that it has essentially reached the free ending of the second fluid space 12 when a further movement of the first piston 11 gets blocked (see FIG. 5c).

FIG. 6 shows an embodiment of a displacement device 1 according to the invention where the first piston 21 and the second piston 22 are fluid-coupled. This coupling may provide for an actuation of the second piston 22 in dependence on the first piston 21 based on pneumatic force or hydraulic force, depending on the fluid being a gas or a liquid. This fluid is represented by the small black spots located in the connection piece 70 arranged between the first fluid space 11 and the second fluid space 12 and provides for an operational coupling between the first piston 21 and the second piston 22 and thus ensures an actuation of the second piston 22 in dependence on the first piston 21. When the first piston 21 is actuated by an actuation volume that causes a downwards movement of the first piston 21 by a first distance $d_1$, fluid in the connection piece 70 gets displaced. The displaced fluid volume depends on the first distance $d_1$ as well as on the cross-sectional area of the connection piece 70 on the side being operationally connected to the second chamber 112 of the first fluid space 11. In case the cross-sectional area of the connection piece 70 on the side being operationally connected to the first chamber 121 of the second fluid space 12 were identical to other side, the second piston 22 would be pushed by a second distance $d_2$ identical to the first distance $d_1$ and the volume transmission were dependent on the piston displacement area of the first piston 21 and the second piston 22 only. However, the cross-sectional area of the connection piece 70 on the side being operationally connected to the first chamber 121 of the second fluid space 12 of this embodiment is not identical to the cross-sectional area of the connection piece 70 on the side being operationally connected to the second chamber 112 of the first fluid space 11. In consequence, it is also the ratio of the cross-sectional areas of the connection piece 70 having an impact on the volume transmission ratio. As the cross-sectional area of the connection piece 70 on the side being operationally connected to the second chamber 112 of the first fluid space 11 is smaller than the cross-sectional area of the connection piece 70 on the side being operationally connected to the first chamber 121 of the second fluid space 12, the second distance $d_2$ is shorter than the first distance $d_1$. The pneumatic or hydraulic force can thus be used for linearly actuating the second piston 22 or for actuating and further transmitting the ratio of the actuation volume to the displacement volume.

FIG. 7a shows an embodiment of a displacement device 1 comprising a first fluid space 11 designed separately from a second fluid space 12. The second fluid space 12 of this embodiment is a standard positive displacement tip. FIG. 7b shows the same displacement device 1 in assembled state. The reference signs are only displayed in FIG. 7a for reasons of clarity. The first piston 21 of the first fluid space 11, which first piston displacement area $A_1$ separates the first chamber 111 of the first fluid space 11 and the second chamber 112 of the first fluid space 11, comprises a means for coupling with the second piston 22 of the second fluid space 12. The coupling provides for a movement of the second piston 22 in dependence on the first piston 21. The means for coupling is illustrated by means of the narrow prolongation adjacent to the first displacement area $A_1$. The first fluid space 11 comprises connection means 30 for getting connected to a pipetting device (not shown). The second chamber 112 of the first fluid space 11 comprises pressure equilibrium means 40. The second fluid space 12 comprises connection means 30 for getting connected to the first fluid space 11. Both the connection means 30 are preferably constructed to allow a plug connection by simply plugging the first fluid space 11 on the pipetting device or vice versa and the second fluid space 12 on the first fluid space 11 or vice versa. The second piston 22 is designed as a bar of a continuous cross-sectional area that is essentially equivalent to the cross-sectional area of the second fluid space 12. In consequence, the body of the second piston 12 fills the first chamber 121 of the second fluid space 12. To avoid a sliding of the second piston 22 through the second chamber 122 of the second fluid space 12, the second piston 22 comprises a thickening. On the other hand, the first fluid space 11 comprises means for limiting the movement of the first piston 21 such as one or more protrusions located in the second chamber 112 of the first fluid space 11.

FIG. 8 shows a displacement device set 1 comprising a first fluid space 11 designed separately from three different second fluid spaces 12. The first fluid space 11 and the most left of the second fluid spaces 12 are designed identical to the ones shown in FIG. 7a and FIG. 7b. However, the set of FIG. 8 comprises two more second fluid spaces 12 that can be combined with the first fluid space 11 as described based on FIG. 7a and FIG. 7b. Each of the second fluid spaces 12 comprises a second piston 22 with a second piston displacement area $A_2$ different in size. The second fluid space 12 comprises the second piston 22 having the largest second piston displacement area $A_2$ and the second fluid space 12 on the right-hand side comprises the second piston 22 having the smallest second piston displacement area $A_2$. By exchanging the second fluid spaces 12 of the set, different volume transmission can be provided without having to exchange the complete displacement device. The smaller the second piston displacement area $A_2$, the larger is the volume transmission.

FIG. 9 shows an embodiment of a displacement device 1 that is in particular suitable for displacing powder or suspensions. The displacement device 1 is in general designed like the displacement device of FIG. 5a to FIG. 5c. However, the second piston 22 is not designed as a bar of a continuous cross-sectional area but comprises three protrusions having essentially the same cross-sectional area, which is essentially equivalent to the cross-sectional area of the second fluid space 12. In this embodiment, the three protrusions form two powder chambers in the second chamber 122 of the second fluid space 12; a first one between the first protrusion and the second protrusion and a second one between the second protrusion and the third protrusion. The duty of the bottom protrusion closing the powder chamber is to avoid any loss of powder between aspiration and dispensation. Although the shown embodiment comprises three protrusions, it is enough to provide a second piston with only two protrusions to allow for a reliable aspiration and dispensation of powder or suspensions. Since the cross-sectional areas of the single protrusions are essentially identical, it is the cross-sectional area of the first protrusion that represents the second piston displacement area $A_2$. The second piston displacement area $A_2$ is illustrated separately in the enlarged cut-out on the right-hand side.

FIG. 10 shows a pipetting system 100 comprising a pipetting device 60 and a displacement device 1 according to the invention. The pipetting device 60 comprises a pipetting arm 62. The pipetting arm 62 in turn comprises a pipetting tube 61 which is moveable in x, y and z coordinates by the pipetting arm 62. The displacement device 1 is removably coupled to the pipetting tube 61 by friction fit. The upper part of the first fluid space of the displacement device 1 is plugged on the free end of the pipetting tube 61. Three well plates ready to receive a fluid of interest are provided on the work bench of the pipetting device 60. The pipetting tube 61 is connected by means of a tube, i.e. the pipetting pipe 65, to a means controlling the actuation volume (means not shown), such as e.g. a pressure source (e.g. of an VCP pipetting device) or a syringe pump (e.g. of a fluid pipetting device). The pipetting pipe 65 leads partially through the z-rod 64 of the pipetting arm 62. The pipetting arm 62 and the means for controlling the volume are controlled by a common control unit (not shown).

FIG. 11 shows an embodiment of a displacement device 1 according to the invention that is coupled to a pipetting tube 61 of a pipetting device (not shown) in cross-section. The upper part of the first chamber 111 of the first fluid space 11 surrounds the outer surface of the pipetting tube 61 with its two protrusions meant to ensure a reliable friction fit. The pipette tube 61 is formed as an adapter 63. Pressure equilibration means 40 are located close to the bottom of the second chamber 112 of the device 1. A pipetting pipe 65 that leads through the pipetting tube 61 into the first chamber 111 of the first fluid space 11 of the displacement device 1 provides for the connection to a means for controlling the actuation volume (not shown). The second chamber 112 of the first fluid space 11, the first chamber 121 of the second fluid space 12 and the second chamber 122 of the second fluid space 12 are also illustrated for the sake of completeness.

FIG. 12a shows a z-rod 64 of a pipetting arm of a pipetting device (not shown) and its pipetting tube 61 in cross-section. Such a pipetting tube 61 is for instance suitable for coupling with a displacement device according to the invention (not shown) and can comprise a thread working as coupling means 30. The pipetting pipe 65 that leads through the pipetting tube 61 into the first chamber of the first fluid space of the displacement device provides for the connection to a means for controlling the actuation volume (not shown).

FIG. 12b shows a z-rod 64 of a pipetting arm of comprising an adapter 63 for coupling with a displacement device according to the invention (not shown) in cross-section. The same adapter 63 can be used for coupling conventional disposable pipetting tips. The displacement device is coupled directly to the pipetting tube by means of an adapter 63. The pipetting pipe 65 can protrude from the adapter 63 as shown in this example. Such an adapter 63 may comprise a different cross-sectional diameter than the pipetting tube and/or coupling means such as protrusions or alike to provide for a better fit or even for a connection between a displacement device and a pipetting device at all.

REFERENCE SIGNS

1 Positive displacement device
11 First fluid space

111 First chamber of first fluid space
112 Second chamber of first fluid space
12 Second fluid space
121 First chamber of second fluid space
122 Second chamber of second fluid space
20 Double piston
21 First piston
22 Second piston
30 Connection means
40 Pressure equilibration means
50 Fluid of interest
60 Pipetting device
61 Pipetting tube
62 Pipetting arm
63 Adapter
64 Z-rod of pipetting arm
65 Pipetting pipe
70 Connection piece
100 System
$A_1$ First piston displacement area
$A_2$ Second piston displacement area
$d_1$ First distance
$d_2$ Second distance
$V_a$ Actuation volume
$V_d$ Displacement volume
$V_1$ First volume

The invention claimed is:

1. A pipetting system comprising a pipetting device (60) and a displacement device (1),
wherein said pipetting device (60) is in particular an air pipetting device or a fluid pipetting device or a VCP pipetting device,
wherein said displacement device (1) comprises
a first fluid space (11) separated into a first chamber (111) and a second chamber (112) by a first piston displacement area ($A_1$) of a first piston (21) arranged in a movable manner within said first fluid space (11), wherein said first piston (21) provides for a fluid-sealing separation of said first chamber (111) and said second chamber (112) of said first fluid space (11), said first chamber (111) of said first fluid space (11) being connectable to said pipetting device, and said first piston (21) being actuatable by an actuation volume ($V_a$) of working fluid of said pipetting device; and
a second fluid space (12) separated into a first chamber (121) and a second chamber (122) by a second piston displacement area ($A_2$) of a second piston (22) arranged in a movable manner within said second fluid space (12), wherein said second piston (22) provides for a fluid-sealing separation of said first chamber (121) and said second chamber (122) of said second fluid space (12) at the same time that said first piston (21) provides for the fluid-sealing separation of said first chamber (111) and said second chamber (112) of said first fluid space (11), said second piston (22) being constructed to displace a displacement volume ($V_d$) of a fluid located within said second chamber (122) of said second fluid space (12) when being actuated in dependence on said first piston (21) being actuated by said actuation volume ($V_a$);
wherein said actuation volume ($V_a$) is different from said displacement volume ($V_d$), and
wherein said displacement device (1) is connected to said pipetting device (60), in particular by means of removable sticking to a pipette tube of said pipetting device.

2. The pipetting system according to claim 1, wherein said first piston (21) is constructed to displace a first volume ($V_1$) of a fluid located within said second chamber (112) of said first fluid space (11), said first volume ($V_1$) being in particular of equal size than said actuation volume ($V_a$).

3. The pipetting system according to claim 1, wherein said actuation volume ($V_a$) is larger than said displacement volume ($V_d$), in particular between 10 to 1000 times, further in particular between 50 to 500 times.

4. The pipetting system according to claim 1, wherein said first piston (21) is constructed to cover a first distance ($d_1$) when being actuated by the actuation volume ($V_a$) of the working fluid of said pipetting device, which first distance ($d_1$) is identical to a second distance ($d_2$) covered by said second piston (22) when being actuated in dependence on said first piston (21).

5. A method of translating a first fluid volume to a second fluid volume, comprising the steps of:
providing the pipetting system according to claim 1; and
translating an actuation volume ($V_a$) to a displacement volume ($V_d$).

6. A method of displacing a displacement volume ($V_d$), comprising the step of providing the pipetting system according to claim 1, wherein the pipetting device (60) is constructed to displace an actuation volume ($V_a$), said actuation volume ($V_a$) having a different volume than said displacement volume ($V_d$).

7. A method for displacing a displacement volume ($V_d$) of a fluid, said method comprising:
moving a first piston (21) being arranged in a movable manner within a first fluid space (11), said first fluid space (11) being separated into a first chamber (111) and a second chamber (112) by a first piston displacement area ($A_1$) of said first piston (21), said first piston (21) providing for a fluid-sealing separation of said first chamber (111) and said second chamber (112) of said first fluid space (11), and wherein said moving of said first piston (21) is actuated by an actuation volume ($V_a$) of a working fluid of a pipetting device, and
moving a second piston (22) being arranged in a movable manner within a second fluid space (12), said second fluid space (12) being separated into a first chamber (121) and a second chamber (122) by a second piston displacement area ($A_2$) of said second piston (22), said second piston (22) providing for a fluid-sealing separation of said first chamber (121) and said second chamber (122) of said second fluid space (12) at the same time that said first piston (21) provides for the fluid-sealing separation of said first chamber (111) and said second chamber (112) of said first fluid space (11), such that a displacement volume ($V_d$) of a fluid located within said second chamber (122) of said second fluid space (12) is displaced, wherein said moving of said second piston (22) is actuated in dependence on moving said first piston (21) being actuated by said actuation volume ($V_a$), wherein said actuation volume ($V_a$) is different from said displacement volume ($V_d$).

8. The method according to claim 7, wherein said moving said first piston (21) being arranged in said movable manner within said first fluid space (11) is performed such that a first volume ($V_1$) of a fluid located within said second chamber (112) of said first fluid space (11) is displaced.

9. The method according to claim 7, further comprising:
connecting said first chamber (111) of said first fluid space (11) to a pipetting device, in particular by means of removable sticking said first chamber (111) to a pipette tube of said pipetting device.

10. The method according to claim 7, wherein said moving of said second piston (22) comprises actuating said second piston (22) by at least one of the following:
- mechanical coupling;
- magnetic force;
- pneumatic force;
- hydraulic force.

11. A displacement device (1) for a pipetting system, the displacement device (1) comprising:
- a first fluid space (11) separated into a first chamber (111) and a second chamber (112) by a first piston displacement area ($A_1$) of a first piston (21) arranged in a movable manner within said first fluid space (11), wherein said first piston (21) provides for a fluid-sealing separation of said first chamber (111) and said second chamber (112) of said first fluid space (11), said first chamber (111) of said first fluid space (11) being connectable to a pipetting device, and said first piston (21) being actuatable by an actuation volume ($V_a$) of working fluid of said pipetting device; and
- a second fluid space (12) separated into a first chamber (121) and a second chamber (122) by a second piston displacement area ($A_2$) of a second piston (22) arranged in a movable manner within said second fluid space (12), wherein said second piston (22) provides for a fluid-sealing separation of said first chamber (121) and said second chamber (122) of said second fluid space (12) at the same time that said first piston (21) provides for the fluid-sealing separation of said first chamber (111) and said second chamber (112) of said first fluid space (11), said second piston (22) being constructed to displace a displacement volume ($V_d$) of a fluid located within said second chamber (122) of said second fluid space (12) when being actuated in dependence on said first piston (21) being actuated by said actuation volume ($V_a$);
wherein said actuation volume ($V_a$) is different from said displacement volume ($V_d$).

12. The displacement device (1) according to claim 11, wherein said first piston (21) is constructed to displace a first volume ($V_1$) of a fluid located within said second chamber (112) of said first fluid space (11), said first volume ($V_1$) being in particular of equal size than said actuation volume ($V_a$).

13. The displacement device (1) according to claim 11, wherein said second piston (22) is a positive displacement piston for being in direct contact with said fluid located within said second chamber (122) of said second fluid space (12).

14. The displacement device (1) according to claim 11, wherein the actuation of said second piston (22) in dependence on said first piston (21) is based on at least one of the following:
- mechanical coupling;
- magnetic force;
- pneumatic force;
- hydraulic force.

15. The displacement device (1) according to claim 11, wherein said first piston (21) is mechanically connected to said second piston (22), in particular removably connected or permanently connected.

16. The displacement device (1) according to claim 11, wherein said first fluid space (11) is connected to said second fluid space (12), in particular said second chamber (112) of said first fluid space (11) to said first chamber (121) of said second fluid space (12).

17. The displacement device (1) according to claim 16, wherein said first fluid space (11) and said second fluid space (12) are removably connected or permanently connected.

18. The displacement device (1) according to claim 16, wherein the first piston (21) controls the movement of the second piston (22) such that the second piston (22) cannot enter the second chamber (112) of the first fluid space (11).

19. The displacement device (1) according to claim 11, wherein said second fluid space (12) is at least in parts formed by a standard positive displacement tip.

20. The displacement device (1) according to claim 11, wherein at least one of said second chamber (112) of said first fluid space (11) and said first chamber (121) of said second fluid space (12) comprises a pressure equilibrium means (40).

21. The displacement device (1) according to claim 11, wherein said actuation volume ($V_a$) is larger than said displacement volume ($V_d$), in particular between 10 to 1000 times, further in particular between 50 to 500 times.

22. The displacement device (1) according to claim 11, wherein said first piston (21) covers a first distance ($d_1$) when being actuated by the actuation volume ($V_a$) of the working fluid of said pipetting device, which first distance ($d_1$) is identical to a second distance ($d_2$) covered by said second piston (22) when being actuated in dependence on said first piston (21).

23. The displacement device (1) according to claim 11, wherein said first piston displacement area ($A_1$) is different in size from said second piston displacement area ($A_2$).

24. The displacement device (1) according to claim 23, wherein said first piston displacement area ($A_1$) is larger than said second piston displacement area ($A_2$), in particular between 10 to 1000 times, further in particular between 50 to 500 times.

25. The displacement device (1) according to claim 11, wherein at least one of at least one of said first chamber (111) of said first fluid space (11) and said second chamber (112) of said first fluid space (11), and at least one of said first chamber (121) of said second fluid space (12) and said second chamber (122) of said second fluid space (12) comprise an electrode that is constructed to form a measuring capacitor together with a further electrode.

26. A displacement device set comprising at least one displacement device (1) according to claim 11 and at least one further second fluid space (12) being designed combinable with said first fluid space (11) of said at least one displacement device (1),
wherein said first fluid space (11) of said at least one displacement device (1) is designed separately from said second fluid space (12) of said at least one displacement device (1), and
wherein said at least one further second fluid space (12) being separated into a first chamber (121) and a second chamber (122) by the second piston displacement area ($A_2$) of a second piston (22) arranged in a movable manner within said further second fluid space (12) comprises a second piston displacement area ($A_2$) being different from the second piston displacement area ($A_2$) of the second fluid space (12) of said at least one displacement device (1).

* * * * *